(12) United States Patent
Chang et al.

(10) Patent No.: US 11,329,489 B2
(45) Date of Patent: May 10, 2022

(54) RECHARGEABLE BATTERY WITH COMMUNICATION AND BATTERY CONTROL CIRCUIT THEREOF

(71) Applicant: RICHTEK TECHNOLOGY CORPORATION, Zhubei (TW)

(72) Inventors: Wei-Hsu Chang, Hsinchu (TW); Ta-Yung Yang, Taoyuan (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 235 days.

(21) Appl. No.: 16/666,358

(22) Filed: Oct. 28, 2019

(65) Prior Publication Data
US 2020/0067322 A1   Feb. 27, 2020

Related U.S. Application Data

(62) Division of application No. 15/865,224, filed on Jan. 8, 2018, now abandoned.
(Continued)

(30) Foreign Application Priority Data

Aug. 9, 2017 (TW) .................................. 106126898

(51) Int. Cl.
*H02J 7/00* (2006.01)
*H01M 10/44* (2006.01)
(Continued)

(52) U.S. Cl.
CPC ....... *H02J 7/00036* (2020.01); *H01M 10/425* (2013.01); *H01M 10/44* (2013.01);
(Continued)

(58) Field of Classification Search
CPC .. H02J 7/00036; H02J 7/00032; H02J 7/0063; H02J 7/007; H02J 2207/20;
(Continued)

(56) References Cited

U.S. PATENT DOCUMENTS 6,163,131 A * 12/2000 Gartstein ................ H02J 50/12
   320/118
2009/0039833 A1* 2/2009 Kitagawa ............... H01M 10/46
   320/134
(Continued)

FOREIGN PATENT DOCUMENTS

DE         102014005580 A1 *  10/2014 ............ H02J 7/0031

*Primary Examiner* — Richard Isla
*Assistant Examiner* — Manuel Hernandez
(74) *Attorney, Agent, or Firm* — Tung & Associates

(57) ABSTRACT

A rechargeable battery is coupled to a power delivery unit or an external load unit. In a charging mode, the power delivery unit converts an input power to a converted voltage and/or current. A charging circuit converts the converted voltage and/or current to a charging voltage and/or current for charging the rechargeable battery. Power data is communicated between the power delivery unit and the rechargeable battery by: 1) the power delivery unit adjusting the converted voltage, wherein the power data is expressed by plural voltage levels of the converted voltage; and/or 2) the rechargeable battery adjusting a battery input current, wherein the power data is expressed by plural current levels of the battery input current. At least one of the converted voltage, the converted current, the charging voltage, or the charging current is adjusted according to the power data.

14 Claims, 5 Drawing Sheets

Related U.S. Application Data

(60) Provisional application No. 62/457,352, filed on Feb. 10, 2017.

(51) Int. Cl.
*H01M 10/46* (2006.01)
*H01M 10/42* (2006.01)

(52) U.S. Cl.
CPC ............ *H01M 10/46* (2013.01); *H02J 7/007* (2013.01); *H02J 7/00032* (2020.01); *H02J 7/0063* (2013.01); *H01M 2010/4271* (2013.01); *H01M 2010/4278* (2013.01); *H02J 2207/20* (2020.01)

(58) Field of Classification Search
CPC .... H01M 10/425; H01M 10/46; H01M 10/44; H01M 2010/4271; H01M 2010/4278
USPC ......................................................... 320/107
See application file for complete search history.

(56) References Cited

U.S. PATENT DOCUMENTS

| | | | |
|---|---|---|---|
| 2016/0218523 A1* | 7/2016 | Curtis | ............... H01M 10/4257 |
| 2018/0123395 A1* | 5/2018 | Onishi | .................... H02J 7/025 |
| 2021/0376624 A1* | 12/2021 | Kono | .................... H02J 7/0063 |

* cited by examiner

RECHARGEABLE BATTERY WITH COMMUNICATION AND BATTERY CONTROL CIRCUIT THEREOF

CROSS REFERENCE

The present invention claims priority to U.S. 62/457,352, filed on Feb. 10, 2017, and TW 106126898, filed on Aug. 9, 2017.

The present invention is a divisional application of U.S. Ser. No. 15/865,224 filed on Jan. 8, 2018.

BACKGROUND OF THE INVENTION

Field of Invention

The present invention relates to a rechargeable battery; particularly, it relates to a rechargeable battery with communication function. The present invention also relates to a battery control circuit of the rechargeable battery.

Description of Related Art

FIG. 1 shows a prior art universal Li-ion rechargeable battery 1 which comprises a battery control circuit 11 and a Li-ion battery cell 12. The battery control circuit 11 includes a charging circuit 111 and a supplying power converter circuit 112. In a charging mode (for example but not limited to: when it is detected and found that the voltage level of the conversion node NX is higher than 4.5V), the charging circuit 111 converts the converted voltage VX provided by the power delivery unit 20 to a charging voltage VCHG or a charging current ICHG, to charge the Li-ion battery cell 12. And, in a supply mode, the supplying power converter circuit 112 converts the voltage of the battery cell 12 (for example but not limited to 3.7V) to a standard voltage of a universal dry cell (for example but not limited to 1.5V of an AA or AAA cell). As thus, the universal Li-ion rechargeable battery 1 may be used to replace a conventional disposable universal carbon zinc battery or a rechargeable universal NiMH battery.

The prior art circuit in FIG. 1 has a drawback that during charging, the external voltage or current provided through the conversion node NX cannot be adjusted either according to the requirements of the battery or the charging stages; therefore, the charging current is usually selected to be lower, which leads to longer charging time and poor user experience. Besides, when the rechargeable battery supplies power to a load, the load cannot obtain the status of the Li-ion battery cell and hence cannot adjust the load current adaptively, which may cause the battery cell 12 to over discharge and shorten the life span of the battery cell.

Compared to the prior art in FIG. 1, the present invention is advantageous in being able to communicate with external power delivery circuits, whereby the battery cell can be charged with a better charging power and the charging time can be effectively shortened. Besides, the battery cell has a longer life span since it is able to communicate with the load.

SUMMARY OF THE INVENTION

From one perspective, the present invention provides a rechargeable battery which is configured to be coupled to a power delivery unit or an external load unit through a conversion node, wherein the power delivery unit includes a delivering power converter circuit and a delivery control circuit, the rechargeable battery comprising: a battery control circuit, including: a charging circuit; a supplying power converter circuit; and a battery control unit; and a battery cell; wherein in a charging mode, the power delivery unit converts an input power to a converted power on the conversion node, wherein the converted power includes a converted voltage and a converted current, and the charging circuit converts the converted power to a charging power to charge the battery cell, wherein the charging power includes a charging voltage and a charging current, and in the charging mode, power data is communicated between the power delivery unit and the rechargeable battery through the conversion node by at least one of the following ways: (1) the delivery control circuit transmitting the power data through the conversion node by controlling the delivering power converter circuit to adjust the converted voltage, wherein the power data is expressed by plural voltage levels of the converted voltage, and the battery control unit receiving the power data through the conversion node by sensing the converted voltage; and/or (2) the battery control unit transmitting the power data through the conversion node by adjusting a battery input current, wherein the power data is expressed by plural current levels of the battery input current, and the delivery control circuit receiving the power data through the conversion node by sensing the battery input current; wherein at least one of the converted voltage, the converted current, the charging voltage, or the charging current is adjusted according to the power data; wherein in a supply mode, the supplying power converter circuit converts a battery voltage of the battery cell to an output power on the conversion node to supply power to the external load unit, wherein the output power is compliant to a universal battery specification.

In one embodiment, the power data is defined by adjusting a time interval between the plural voltage levels and/or between the plural current levels.

In one embodiment, the external load unit includes a load control circuit and an adjustable load, and the adjustable load consumes a load current, and the output power includes an output voltage, wherein in the supply mode, the power data is communicated between the external load unit and the rechargeable battery through the conversion node by one of the following ways: (1) the load control circuit transmitting the power data through the conversion node by adjusting the load current, wherein the power data is expressed by plural current levels of the load current, and the battery control unit receiving the power data through the conversion node by sensing the load current; and/or (2) the battery control unit transmitting the power data through the conversion node by controlling the supplying power converter circuit to adjust the output voltage, wherein the power data is expressed by plural voltage levels of the output voltage, and the load control circuit receiving the power data through the conversion node by sensing the output voltage; wherein at least one of the output voltage or the load current is adjusted according to the power data.

In one embodiment, the battery control circuit and the battery cell are assembled into a battery housing which is compliant to the universal battery specification.

In one embodiment, the output power includes an output voltage which substantially is 1.5V.

In one embodiment, the battery control unit includes a switch and a current source coupled to the conversion node, wherein the battery control unit operates the switch and the current source to adjust the battery input current, so as to transmit the power data through the conversion node by the plural current levels.

From another perspective, the present invention provides a battery control circuit configured to operably control a rechargeable battery which is configured to be coupled to a power delivery unit or an external load unit through a conversion node, wherein the power delivery unit includes a delivering power converter circuit and a delivery control circuit, and the rechargeable battery includes the battery control circuit and a battery cell; the battery control circuit comprising: a charging circuit; a supplying power converter circuit; and a battery control unit; wherein in a charging mode, the power delivery unit converts an input power to a converted power on the conversion node, wherein the converted power includes a converted voltage and a converted current, and the charging circuit converts the converted power to a charging power to charge the battery cell, wherein the charging power includes a charging voltage and a charging current, and in the charging mode, power data is communicated between the power delivery unit and the rechargeable battery through the conversion node by at least one of the following ways: (1) the delivery control circuit transmitting the power data through the conversion node by controlling the delivering power converter circuit to adjust the converted voltage, wherein the power data is expressed by plural voltage levels of the converted voltage, and the battery control unit receiving the power data through the conversion node by sensing the converted voltage; and/or (2) the battery control unit transmitting the power data through the conversion node by adjusting a battery input current, wherein the power data is expressed by plural current levels of the battery input current, and the delivery control circuit receiving the power data through the conversion node by sensing the battery input current; wherein at least one of the converted voltage, the converted current, the charging voltage, or the charging current is adjusted according to the power data; wherein in a supply mode, the supplying power converter circuit converts a battery voltage of the battery cell to an output power on the conversion node to supply power to the external load unit, wherein the output power is compliant to a universal battery specification.

From another perspective, the present invention provides a rechargeable battery, configured to be coupled to a power delivery unit or an external load unit through a conversion node, wherein the power delivery unit includes a delivering power converter circuit, and the external load unit includes a load control circuit and an adjustable load, wherein the adjustable load consumes a load current; the rechargeable battery comprising: a battery control circuit, including: a charging circuit; a supplying power converter circuit; and a battery control unit; and a battery cell; wherein in a supply mode, the supplying power converter circuit converts a battery voltage of the battery cell to an output power on the conversion node to supply power to the external load unit, wherein the output power is compliant to a universal battery specification, and in the supply mode, power data is communicated between the external load unit and the rechargeable battery through the conversion node by one of the following ways: (1) the load control circuit transmitting the power data through the conversion node by adjusting the load current, wherein the power data is expressed by plural current levels of the load current, and the battery control unit receiving the power data through the conversion node by sensing the load current; and/or (2) the battery control unit transmitting the power data through the conversion node by controlling the supplying power converter circuit to adjust the output voltage, wherein the power data is expressed by plural voltage levels of the output voltage, and the load control circuit receiving the power data through the conversion node by sensing the output voltage; wherein at least one of the output voltage or the load current is adjusted according to the power data; wherein in a charging mode, the power delivery unit converts an input power to a converted power on the conversion node, and the charging circuit converts the converted power to a charging power to charge the battery cell.

From another perspective, the present invention provides a battery control circuit configured to operably control a rechargeable battery which is configured to be coupled to a power delivery unit or an external load unit through a conversion node, wherein the power delivery unit includes a delivering power converter circuit, and the external load unit includes a load control circuit and an adjustable load, wherein the adjustable load consumes a load current, wherein the rechargeable battery includes the battery control circuit and a battery cell; the battery control circuit comprising: a charging circuit; a supplying power converter circuit; and a battery control unit; wherein in a supply mode, the supplying power converter circuit converts a battery voltage of the battery cell to an output power on the conversion node to supply power to the external load unit, wherein the output power is compliant to a universal battery specification, and in the supply mode, power data is communicated between the external load unit and the rechargeable battery through the conversion node by one of the following ways: (1) the load control circuit transmitting the power data through the conversion node by adjusting the load current, wherein the power data is expressed by plural current levels of the load current, and the battery control unit receiving the power data through the conversion node by sensing the load current; and/or (2) the battery control unit transmitting the power data through the conversion node by controlling the supplying power converter circuit to adjust the output voltage, wherein the power data is expressed by plural voltage levels of the output voltage, and the load control circuit receiving the power data through the conversion node by sensing the output voltage; wherein at least one of the output voltage or the load current is adjusted according to the power data; wherein in a charging mode, the power delivery unit converts an input power to a converted power on the conversion node, and the charging circuit converts the converted power to a charging power to charge the battery cell.

From another perspective, the present invention provides a power delivery unit, coupled to a rechargeable battery through a conversion node, wherein the rechargeable battery includes a battery control circuit which includes: a charging circuit; a supplying power converter circuit; and a battery control unit; and a battery cell; the power delivery unit comprising: a delivering power converter circuit; and a delivery control circuit; wherein in a charging mode, the power delivery unit converts an input power to a converted power on the conversion node, wherein the converted power includes a converted voltage and a converted current, and the charging circuit converts the converted power to a charging power to charge the battery cell, wherein the charging power includes a charging voltage and a charging current, and in the charging mode, power data is communicated between the power delivery unit and the rechargeable battery through the conversion node by at least one of the following ways: (1) the delivery control circuit transmitting the power data through the conversion node by controlling the delivering power converter circuit to adjust the converted voltage, wherein the power data is expressed by plural voltage levels of the converted voltage, and the battery control unit receiving the power data through the conversion node by sensing the converted voltage; and/or (2) the battery control unit transmitting the power data through the conversion node by adjusting a battery input current, wherein the power data is expressed by plural current levels of the battery input current, and the delivery control circuit receiving the power data through the conversion node by sensing the battery input current; wherein at least one of the converted voltage, the converted current, the charging voltage, or the charging current is adjusted according to the power data.

From another perspective, the present invention provides an external load unit, coupled to a rechargeable battery through a conversion node, wherein the rechargeable battery includes a battery control circuit which includes: a charging circuit; a supplying power converter circuit; and a battery control unit; and a battery cell; the external load unit comprising: a load control circuit; and an adjustable load which consumes a load current; wherein in a supply mode, the supplying power converter circuit converts a battery voltage of the battery cell to an output power on the conversion node to supply power to the external load unit, wherein the output power is compliant to a universal battery specification, and in the supply mode, power data is communicated between the external load unit and the rechargeable battery through the conversion node by one of the following ways: (1) the load control circuit transmitting the power data through the conversion node by adjusting the load current, wherein the power data is expressed by plural current levels of the load current, and the battery control unit receiving the power data through the conversion node by sensing the load current; and/or (2) the battery control unit transmitting the power data through the conversion node by controlling the supplying power converter circuit to adjust the output voltage, wherein the power data is expressed by plural voltage levels of the output voltage, and the load control circuit receiving the power data through the conversion node by sensing the output voltage; wherein at least one of the output voltage or the load current is adjusted according to the power data.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations between the circuits and the signal waveforms, but not drawn according to actual scale.

Figure 1:
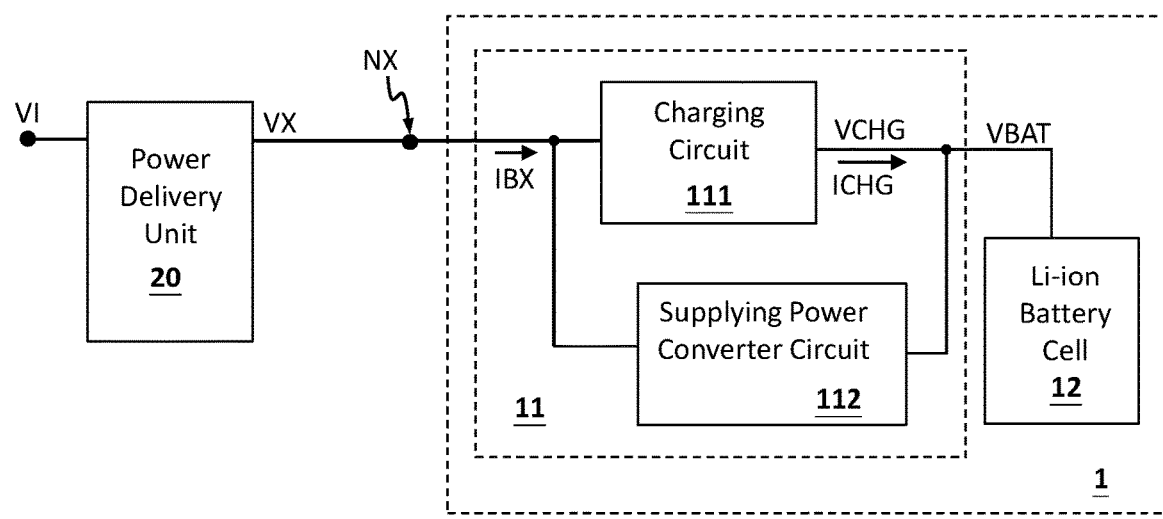
FIG. 1 shows a block diagram of a prior art rechargeable battery.
Figure 2:
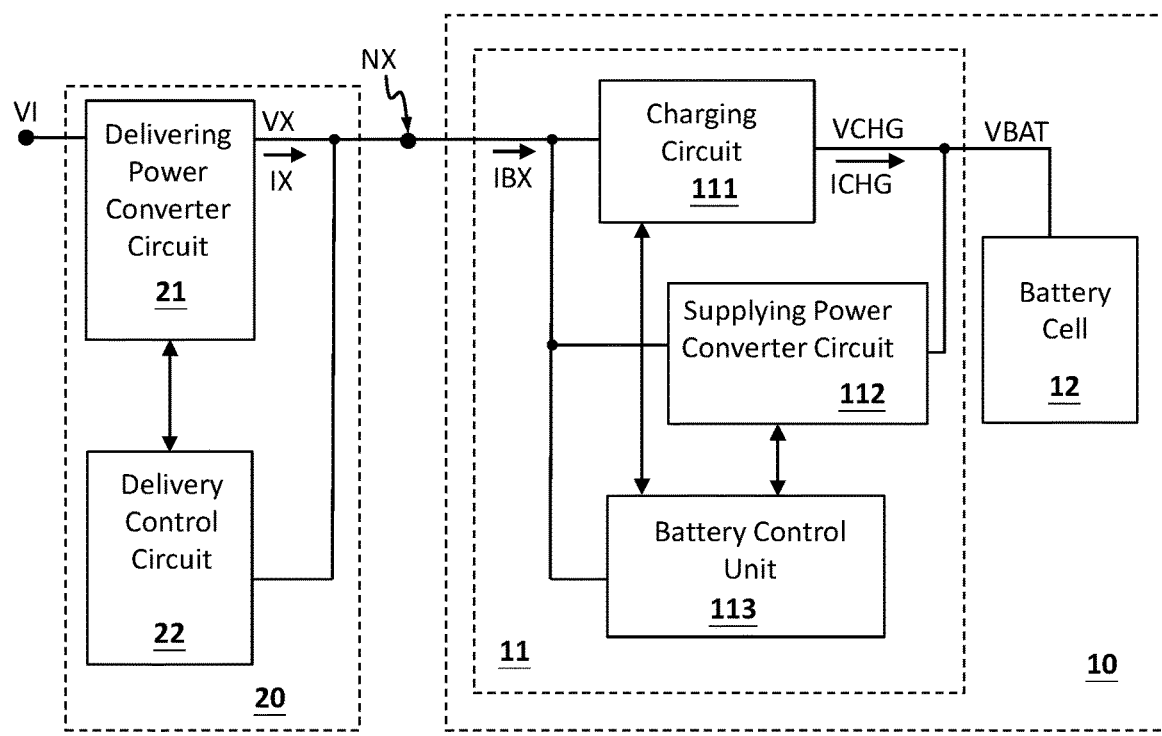
FIG. 2 shows a block diagram of an embodiment of the rechargeable battery with communication function according to the present invention.

FIG. 2 shows a schematic diagram of an application embodiment of the rechargeable battery (rechargeable battery 10) according to the present invention. As shown in the figure, the rechargeable battery 10 is coupled to a power delivery unit 20 through a conversion node NX, wherein the power delivery unit 20 may be a travel adaptor, or a power bank. The power delivery unit 20 includes a delivering power converter circuit 21 and a delivery control circuit 22. The rechargeable battery 10 for example may be a universal Li-ion rechargeable battery. The rechargeable battery 10 comprises a battery control circuit 11 and a battery cell 12. In one embodiment, the battery control circuit 11 and the battery cell 12 are assembled into a battery housing, and the battery housing is compliant to a universal battery specification such as AA or AAA universal battery specification. And, the conversion node NX for example may be but is not limited to a positive electrode of the AA or AAA battery housing.

The battery control circuit 11 includes a charging circuit 111, a supplying power converter circuit 112, and a battery control unit 113. In a charging mode, the power delivery unit 20 converts an input power VI to a converted power on the conversion node NX, wherein the converted power includes a converted voltage VX and a converted current IX, and the charging circuit 111 converts the converted power to a charging power to charge the battery cell 12, wherein the charging power includes a charging voltage VCHG and a charging current ICHG. In the charging mode, data related to power control ("power data" hereinafter) is communicated between the power delivery unit 20 and the rechargeable battery 10 through the conversion node NX by at least one of the following ways: (1) the delivery control circuit 22 transmitting the power data through the conversion node NX by controlling the delivering power converter circuit 21 to adjust the converted voltage VX, wherein the power data is expressed by plural voltage levels of the converted voltage VX, and the battery control unit 113 receiving the power data through the conversion node NX by sensing the converted voltage VX; and/or (2) the battery control unit 113 transmitting the power data through the conversion node NX by adjusting a battery input current IBX, wherein the power data is expressed by plural current levels of the battery input current IBX, and the delivery control circuit 22 receiving the power data through the conversion node NX by sensing the battery input current IBX. In one embodiment, at least one of the converted voltage VX, the converted current IX, the charging voltage VCHG, or the charging current ICHG is adjusted according to the power data. As an example, the converted voltage VX or the charging voltage VCHG is adjusted to a predetermined voltage level according to the power data, or the converted current IX or the charging current ICHG is adjusted to a predetermined current level according to the power data. The "predetermined" voltage or current level may be a fixed value or an adjustable variable; the same for other "predetermined" throughout the text.

FIG. 2 shows one application (charging operation) of the rechargeable battery 10; in another application embodiment, in a supply mode, the rechargeable battery 10 is coupled to an external load unit through the conversion node NX, and the supplying power converter circuit 112 converts a battery voltage VBAT of the battery cell 12 to an output power on the conversion node NX to supply power to the external load unit, wherein the output power is compliant to a universal battery specification such as AA or AAA universal battery specification, and the output power includes an output voltage which substantially is 1.5V. Note that in one embodiment, it can be arranged so that the battery control unit 113 delivers the power data only in the charging mode, and in this case, the battery control unit 113 is not required to control the supplying power converter circuit 112 as shown in FIG. 2, and the connection between the battery control unit 113 and the supplying power converter circuit 112 can be omitted. Besides, in one embodiment, it can be arranged so that the power control unit 113 is only able to transmit the power data but not able to receive the power data; or, in another embodiment, it can be arranged so that the power control unit 113 is only able to receive the power data but not able to transmit the power data. Besides, in one embodiment, it can be arranged so that the delivery control circuit 22 is only able to transmit the power data but not able to receive the power data; or, in another embodiment, it can be arranged so that the delivery control circuit 22 is only able to receive the power data but not able to transmit the power data.

Note that due to non-idealities caused by for example imperfection of components or imperfect matching among components, the level of the output voltage may not be exactly equal to 1.5V, but just close to 1.5V, and this is what "substantially is 1.5V" means.

Figure 3A:
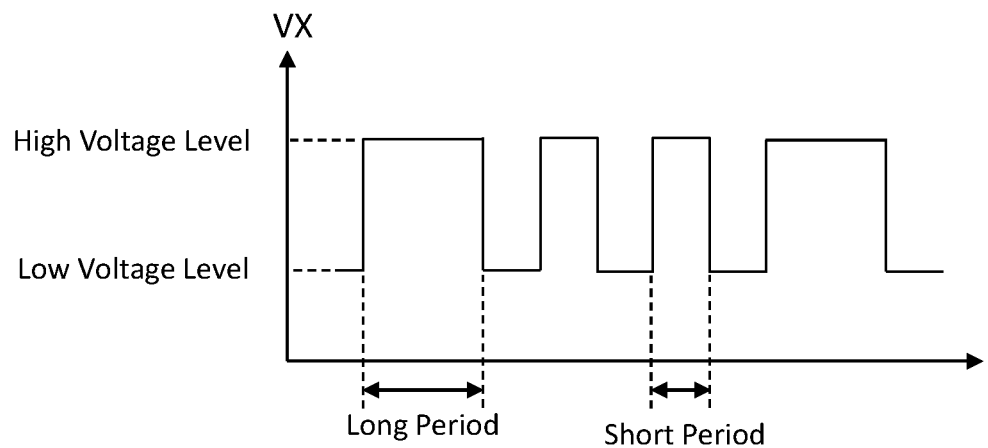
FIGS. 3A and 3B show operation waveforms corresponding to the embodiment shown in FIG. 2.

FIG. 3A shows schematic operation waveforms corresponding to the embodiment shown in FIG. 2. As shown in the figure, in one embodiment, the delivery control circuit 22 controls the delivering power converter circuit 21 to transmit the power data through the conversion node NX; the delivering power converter circuit 21 adjusts the converted voltage VX to plural voltage levels to express the power data. The power data for example may include information of, but not limited to, the target level (s) of the converted voltage VX, the converted current IX, the charging voltage VCHG or the charging current ICHG, or other operation instructions. In one embodiment, the power data delivered with plural voltage levels may be a data stream as shown in the figure, which is a combination of high and low voltage levels. In one embodiment, the high voltage level may be for example 5.1V and the low voltage level may be for example 5V. In another embodiment, the high voltage level may be for example 4.6V and the low voltage level may be for example 4.5V.

Figure 7:
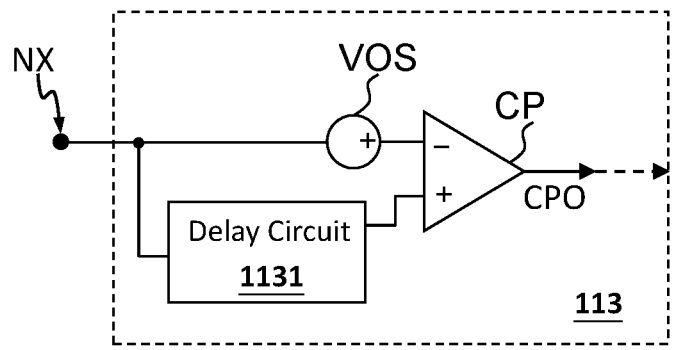
FIG. 7 shows a schematic diagram of another embodiment of battery control circuit of the rechargeable battery with communication function according to the present invention.

Still referring to FIG. 3A, in one embodiment, the high voltage level and the low voltage level on the conversion node NX respectively represent logic 1 and logic 0; however, the present invention is not limited to this arrangement. In another embodiment, the power data may be encoded by the length (the time interval) of the high voltage level and/or the low voltage level, to represent logic 1 or logic 0. As an example, a longer period (e.g. 300 ms) of the high voltage level represents logic 1 and a shorter period (e.g. 100 ms) of the high voltage level represents logic 0. Also referring to FIG. 7, the battery control unit 113 may include a comparing circuit CP configured to operably compare a delayed version of the voltage on the conversion node (e.g. the converted voltage VX delayed by a delay circuit 1131) and an offset version of the voltage on the conversion node (e.g. the converted voltage VX offset by an offset voltage VOS) to decode the data stream encoded by the aforementioned longer and/or shorter periods.

Figure 3B:
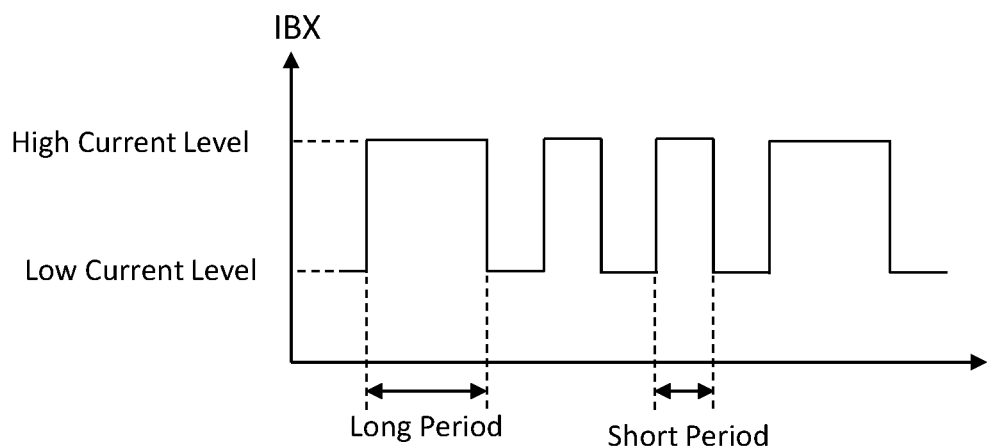
Figure 6:
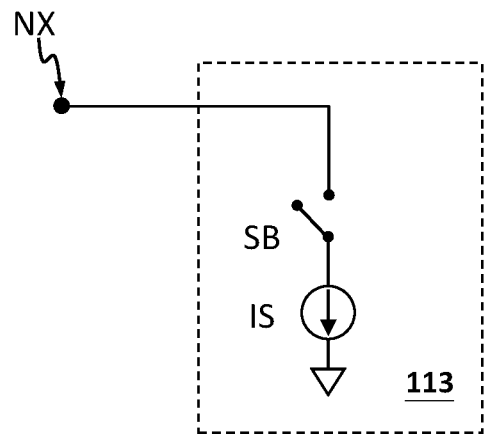
FIG. 6 shows a schematic diagram of an embodiment of battery control circuit of the rechargeable battery with communication function according to the present invention.

FIG. 3B shows schematic operation waveforms corresponding to the embodiment shown in FIG. 2. As shown in the figure, in one embodiment, the battery control unit 113 transmits the power data through the conversion node NX; the battery control unit 113 adjusts the battery input current IBX to plural current levels to express the power data. FIG. 6 shows an embodiment for adjusting the battery input current IBX. The battery control unit 113 includes a current source IS coupled with a switch SB, the battery input current IBX is adjusted by operating the switch SB, so as to transmit the power data through the conversion node NX with plural current levels. In one embodiment, the power data delivered with plural current levels may be a data stream as shown in FIG. 3B, which is a combination of high and low current levels. In one embodiment, the high current level may be for example 0.6A and the low current level may be for example 0.5A. In another embodiment, the high current level may be for example 1.6A and the low current level may be for example 1.5A.

Still referring to FIG. 3B, in one embodiment, the high current level and the low current level on the conversion node NX respectively represent logic 1 and logic 0; however, the present invention is not limited to this arrangement. In another embodiment, the power data may be encoded by the length (the time interval) of the high current level and/or the low current level, to represent the logic 1 or logic 0. As an example, a longer period (e.g. 300 ms) of the high current level represents logic 1 and a shorter period (e.g. 100 ms) of the high current level represents logic 0.

The above embodiments illustrate that power data can be encoded by adjusting the time interval(s) between the plural voltage levels and/or between the plural current levels; one skilled in this art can conceive various modifications, which should all be considered to fall within the scope of the present invention.

Figure 4:
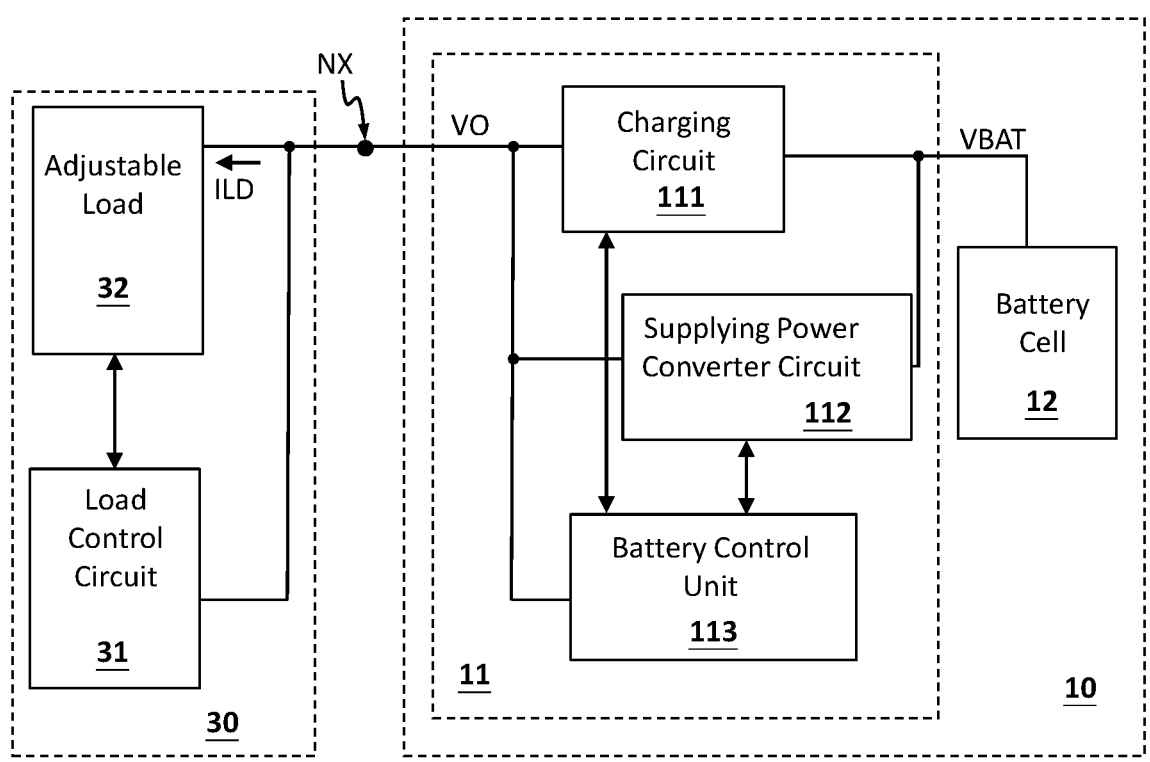
FIG. 4 shows a block diagram of another embodiment of the rechargeable battery with communication function according to the present invention.

FIG. 4 shows a schematic diagram of another application embodiment of the rechargeable battery (rechargeable battery 10) according to the present invention. As shown in the figure, the rechargeable battery 10 is coupled to an external load unit 30 through the conversion node NX, wherein the external load unit 30 includes a load control circuit 31 and an adjustable load 32, wherein the adjustable load 32 consumes a load current ILD. In this embodiment, in the supply mode, the supplying power converter circuit 112 converts a battery voltage VBAT of the battery cell 12 to an output power on the conversion node NX to supply power to the external load unit 30; the output power includes an output voltage VO, and is compliant to the aforementioned universal battery specification. In the supply mode, power data is communicated between the external load unit 30 and the rechargeable battery 10 through the conversion node NX by at least one of the following ways: (1) the load control circuit 31 transmitting the power data through the conversion node NX by adjusting the load current ILD, wherein the power data is expressed by plural current levels of the load current ILD, and the battery control unit 113 receiving the power data through the conversion node NX by sensing the load current ILD; and/or (2) the battery control unit 113 transmitting the power data through the conversion node NX by controlling the supplying power converter circuit 112 to adjust the output voltage VO, wherein the power data is expressed by plural voltage levels of the output voltage VO, and the load control circuit 31 receiving the power data through the conversion node NX by sensing the output voltage VO. And, at least one of the output voltage VO or the load current ILD is adjusted according to the power data. As an example, the output voltage VO is adjusted to a predetermined voltage level according to the power data, or the load current ILD is adjusted to a predetermined current level according to the power data.

FIG. 4 shows one application (power supply operation) of the rechargeable battery 10; in another application embodiment, in the charging mode, a power delivery unit converts the input power VI to a converted power on the conversion node NX, and the charging circuit 111 converts the converted power to a charging power (including for example a charging voltage and a charging current) to charge the battery cell 12. Note that in one embodiment, it can be arranged so that the battery control unit 113 delivers the power data only in the charging mode, and in this case, the battery control unit 113 is not required to control the supplying power converter circuit 112 as shown in FIG. 4, and the connection between the battery control unit 113 and the supplying power converter circuit 112 can be omitted. Besides, in one embodiment, it can be arranged so that the power control unit 113 is only able to transmit the power data but not able to receive the power data; or, in another embodiment, it can be arranged so that the power control unit 113 is only able to receive the power data but not able to transmit the power data. Besides, in one embodiment, it can be arranged so that the load control circuit 31 is only able to transmit the power data but not able to receive the power data; or, in another embodiment, it can be arranged so that the load control circuit 31 is only able to receive the power data but not able to transmit the power data.

Figure 5A:
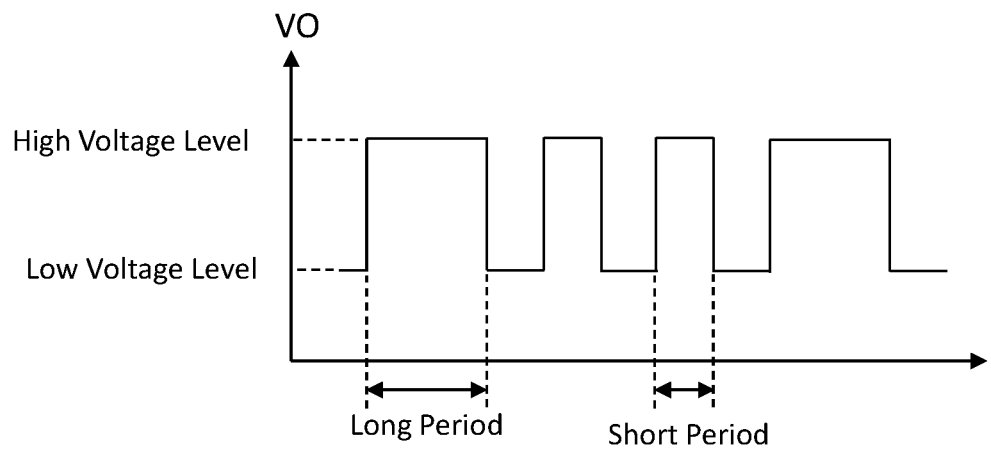
FIGS. 5A and 5B show operation waveforms corresponding to the embodiment shown in FIG. 4.

FIG. 5A shows schematic operation waveforms corresponding to the embodiment shown in FIG. 4. As shown in the figure, in one embodiment, the battery control unit 113 transmits the power data through the conversion node NX by controlling the supplying power converter circuit 112 to adjust the output voltage VO, wherein the power data is expressed by plural voltage levels by adjusting. The power data for example may include information of, but not limited to, the target level(s) of the output voltage VO or the load current ILD, or other operation instructions. Note that the power data delivered with plural voltage levels may be a data stream as shown in the figure, which is a combination of high and low voltage levels. In one embodiment, the high voltage level may be for example 1.6V and the low voltage level may be for example 1.5V. In another embodiment, the high voltage level may be for example 1.2V and the low voltage level may be for example 1.1V.

Still referring to FIG. 5A, in one embodiment, the high voltage level and the low voltage level on the conversion node NX respectively represent logic 1 and logic 0; however, the present invention is not limited to this arrangement. In another embodiment, the power data may be encoded by the length (the time interval) of the high voltage level and/or the low voltage level to represent the logic 1 or logic 0. As an example, a longer period (e.g. 300 ms) of the high voltage level represents logic 1 and a shorter period (e.g. 100 ms) of the high voltage level represents logic 0.

Figure 5B:
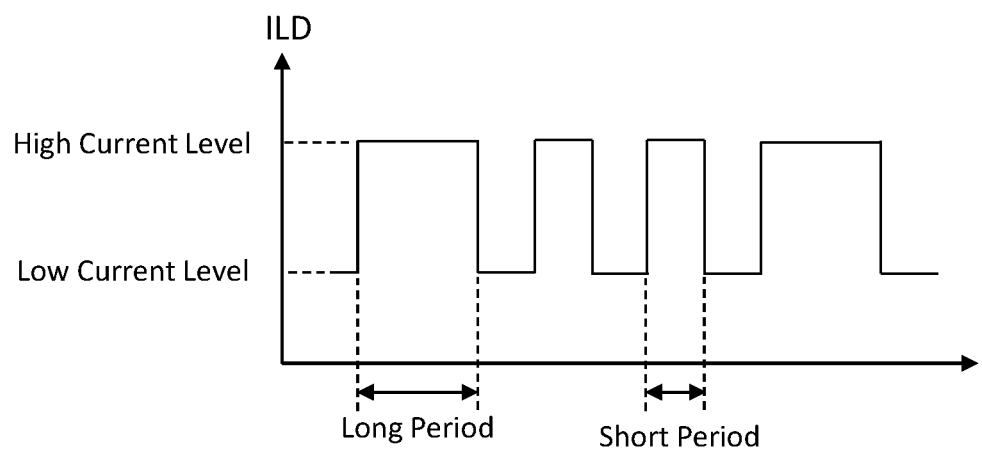

FIG. 5B shows schematic operation waveforms corresponding to the embodiment shown in FIG. 4. As shown in the figure, in one embodiment, the load control unit 31 transmits the power data through the conversion node NX by adjusting the load current ILD, wherein the power data is expressed by plural current levels of the load current ILD. Note that the power data delivered with plural current levels may be a data stream as shown in the figure, which is a combination of high and low current levels. In one embodiment, the high current level may be for example 0.6A and the low current level may be for example 0.5A. In another embodiment, the high current level may be for example 1.1A and the low current level may be for example 1.0A.

Still referring to FIG. 5B, in one embodiment, the high current level and the low current level on the conversion node NX respectively represent logic 1 and logic 0; however, the present invention is not limited to this arrangement. In another embodiment, the power data may be encoded by the length (the time interval) of the high current level and/or the low current level to represent the logic 1 or logic 0. As an example, a longer period (e.g. 300 ms) of the high current level represents logic 1 and a shorter period (e.g. 100 ms) of the high current level represents logic 0.

Note that according to the present invention, the rechargeable battery can communicate with the external power delivery unit, and therefore the battery cell can be charged by a better charging power (for example but not limited to a higher charging voltage or a higher charging current), whereby the charging time can be effectively reduced. Besides, since the rechargeable battery can communicate with the external load unit, the battery life span can be lengthened.

The present invention has been described in considerable detail with reference to certain preferred embodiments thereof. It should be understood that the description is for illustrative purpose, not for limiting the scope of the present invention. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. Furthermore, those skilled in this art can readily conceive variations and modifications within the spirit of the present invention. For example, the rechargeable battery not only can be coupled to and cooperate with a power delivery unit with communication functions, but also can be coupled to and cooperate with a conventional power delivery unit without communication functions. Similarly, the rechargeable battery not only can be coupled to and cooperate with an external load unit with communication functions, but also can be coupled to and cooperate with a conventional external load unit without communication functions. As another example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. The spirit of the present invention should cover all such and other modifications and variations, which should be interpreted to fall within the scope of the following claims and their equivalents.

What is claimed is:

1. A battery control circuit configured to operably control a rechargeable battery which is configured to be coupled to a power delivery unit through a conversion node in a charging mode, or to be coupled to an external load unit through the conversion node in a supply mode, wherein the conversion node is an electrode of the rechargeable battery, wherein the power delivery unit includes a delivering power converter circuit and a delivery control circuit, wherein the external load unit includes a load control circuit and an adjustable load, and the adjustable load consumes a load current, and the rechargeable battery includes a battery cell which is coupled to the battery control circuit; the battery control circuit comprising:

a charging circuit;
a supplying power converter circuit; and
a battery control unit;
wherein in the charging mode, the power delivery unit converts an input power to a converted power on the conversion node, wherein the converted power includes a converted voltage and a converted current, and the charging circuit converts the converted power to a charging power according to power data to charge the battery cell, wherein the charging power includes a charging voltage and a charging current, and in the charging mode, the power data is communicated between the power delivery unit and the rechargeable battery through the conversion node by the following ways:

(1) the delivery control circuit transmitting the power data through the conversion node by controlling the delivering power converter circuit to adaptively adjust the converted voltage according to a present level of the converted voltage, wherein the power data is expressed by plural voltage levels of the converted voltage, and the battery control unit receiving the power data through the conversion node by sensing the converted voltage and the battery control unit controlling the charging circuit to convert the converted power to the charging power according to the power data at the same time; and (2) the battery control unit transmitting the power data through the conversion node by controlling the charging circuit for adaptively adjusting a battery input current according to a present level of the battery input current and generating the charging power to charge the battery at the same time, wherein the power data is expressed by plural current levels of the battery input current, and the delivery control circuit receiving the power data through the conversion node by sensing the battery input current, and the delivery control circuit controlling the delivering power converter circuit to convert the input power to the converted power on the conversion node according to the power data at the same time;

wherein in the charging mode, at least one of the converted voltage, the converted current, the charging voltage, or the charging current is adjusted according to the power data;

wherein in the supply mode, the supplying power converter circuit converts a battery voltage of the battery cell to an output power on the conversion node to supply power to the external load unit, wherein the output power includes an output voltage and is compliant to a universal battery specification;

wherein in the supply mode, the power data is communicated between the external load unit and the rechargeable battery through the conversion node by the following ways:

(1) the load control circuit transmitting the power data through the conversion node by adaptively adjusting the load current according to a present level of the load current and receiving the supply power from the rechargeable battery at the same time, wherein the power data is expressed by plural current levels of the load current, and the battery control unit receiving the power data through the conversion node by sensing the load current and the battery control unit controlling the supplying power converter circuit to convert the battery voltage of the battery cell to the output power on the conversion node to supply power to the external load unit according to the power data at the same time; and (2) the battery control unit transmitting the power data through the conversion node by controlling the supplying power converter circuit to adaptively adjust the output voltage according to a present level of the output voltage and supply the output voltage to the external load unit at the same time, wherein the power data is expressed by plural voltage levels of the output voltage, and the load control circuit receiving the power data through the conversion node by sensing the output voltage, and the external load unit receiving the output power at the same time;

wherein in the supply mode, at least one of the output voltage or the load current is adjusted according to the power data.

2. The battery control circuit of claim 1, wherein the power data is defined by adjusting a time interval between the plural voltage levels and/or between the plural current levels.

3. The battery control circuit of claim 1, wherein the battery control circuit and the battery cell are assembled into a battery housing which is compliant to the universal battery specification, wherein the battery housing includes two and only two electrodes for receiving the converted power and communicating the power data in the charging mode, and for delivering the output power and communicating the power data in the supply mode, wherein one of the two and only two electrodes corresponds to the conversion node.

4. The battery control circuit of claim 1, wherein the battery control unit includes a switch and a current source coupled to the conversion node, wherein the battery control unit operates the switch and the current source to adjust the battery input current, so as to transmit the power data through the conversion node by the plural current levels.

5. A rechargeable battery, configured to be coupled to a power delivery unit through a conversion node in a charging mode, or to be coupled to an external load unit through the conversion node in a supply mode, wherein the conversion node is an electrode of the rechargeable battery, wherein the power delivery unit includes a delivering power converter circuit and a delivery control circuit, wherein the external load unit includes a load control circuit and an adjustable load, and the adjustable load consumes a load current; the rechargeable battery comprising:

a battery control circuit, including:
 a charging circuit;
 a supplying power converter circuit; and
 a battery control unit; and
a battery cell;
wherein in the charging mode, the power delivery unit converts an input power to a converted power on the conversion node, wherein the converted power includes a converted voltage and a converted current, and the charging circuit converts the converted power to a charging power according to power data to charge the battery cell, wherein the charging power includes a charging voltage and a charging current, and in the charging mode, the power data is communicated between the power delivery unit and the rechargeable battery through the conversion node by the following ways:

(1) the delivery control circuit transmitting the power data through the conversion node by controlling the delivering power converter circuit to adaptively adjust the converted voltage according to a present level of the converted voltage, wherein the power data is expressed by plural voltage levels of the converted voltage, and the battery control unit receiving the power data through the conversion node by sensing the converted voltage and the battery control unit controlling the charging circuit to convert the converted power to the charging power according to the power data at the same time; and (2) the battery control unit transmitting the power data through the conversion node by controlling the charging circuit for adaptively adjusting a battery input current according to a present level of the battery input current and generating the charging power to charge the battery at the same time, wherein the power data is expressed by plural current levels of the battery input current, and the delivery control circuit receiving the power data through the conversion node by sensing the battery input current, and the delivery control circuit controlling the delivering power converter circuit to convert the input power to the converted power on the conversion node according to the power data at the same time;

wherein in the charging mode, at least one of the converted voltage, the converted current, the charging voltage, or the charging current is adjusted according to the power data;

wherein in the supply mode, the supplying power converter circuit converts a battery voltage of the battery cell to an output power on the conversion node to supply power to the external load unit, wherein the output power includes an output voltage and is compliant to a universal battery specification;

wherein in the supply mode, the power data is communicated between the external load unit and the rechargeable battery through the conversion node by the following ways:

(1) the load control circuit transmitting the power data through the conversion node by adaptively adjusting the load current according to a present level of the load current and receiving the supply power from the rechargeable battery at the same time, wherein the power data is expressed by plural current levels of the load current, and the battery control unit receiving the power data through the conversion node by sensing the load current and the battery control unit controlling the supplying power converter circuit to convert the battery voltage of the battery cell to the output power on the conversion node to supply power to the external load unit according to the power data at the same time; and (2) the battery control unit transmitting the power data through the conversion node by controlling the supplying power converter circuit to adaptively adjust the output voltage according to a present level of the output voltage and supply the output voltage to the external load unit at the same time, wherein the power data is expressed by plural voltage levels of the output voltage, and the load control circuit receiving the power data through the conversion node by sensing the output voltage, and the external load unit receiving the output power at the same time;

wherein in the supply mode, at least one of the output voltage or the load current is adjusted according to the power data.

6. The rechargeable battery of claim 5, wherein the power data is defined by adjusting a time interval between the plural voltage levels and/or between the plural current levels.

7. The rechargeable battery of claim 5, wherein the battery control circuit and the battery cell are assembled into a battery housing which is compliant to the universal battery specification, wherein the battery housing includes two and only two electrodes for receiving the converted power and communicating the power data in the charging mode, and for delivering the output power and communicating the power data in the supply mode, wherein one of the two and only two electrodes corresponds to the conversion node.

8. The rechargeable battery of claim 5, wherein the output power includes an output voltage which substantially is 1.5V.

9. The rechargeable battery of claim 5, wherein the battery control unit includes a switch and a current source coupled to the conversion node, wherein the battery control unit operates the switch and the current source to adjust the battery input current, so as to transmit the power data through the conversion node by the plural current levels.

10. A rechargeable battery system, comprising:
a rechargeable battery;
a power delivery unit, configured to be coupled to the rechargeable battery through a conversion node in a charging mode; and
an external load, configured to be coupled to the rechargeable battery through the conversion node in a supply mode, wherein the conversion node is an electrode of the rechargeable battery;
wherein the power delivery unit includes a delivering power converter circuit and a delivery control circuit, and the external load unit includes a load control circuit and an adjustable load, wherein the adjustable load consumes a load current; and the rechargeable battery includes a battery control circuit and a battery cell;
wherein the battery control circuit includes:
a charging circuit;
a supplying power converter circuit; and
a battery control unit;
wherein in the charging mode, the power delivery unit converts an input power to a converted power on the conversion node, wherein the converted power includes a converted voltage and a converted current, and the charging circuit converts the converted power to a charging power according to power data to charge the battery cell, wherein the charging power includes a charging voltage and a charging current, and in the charging mode, the power data is communicated between the power delivery unit and the rechargeable battery through the conversion node by the following ways:

(1) the delivery control circuit transmitting the power data through the conversion node by controlling the delivering power converter circuit to adaptively adjust the converted voltage according to a present level of the converted voltage, wherein the power data is expressed by plural voltage levels of the converted voltage, and the battery control unit receiving the power data through the conversion node by sensing the converted voltage and the battery control unit controlling the charging circuit to convert the converted power to the charging power according to the power data at the same time; and (2) the battery control unit transmitting the power data through the conversion node by controlling the charging circuit for adaptively adjusting a battery input current according to a present level of the battery input current and generating the charging power to charge the battery at the same time, wherein the power data is expressed by plural current levels of the battery input current, and the delivery control circuit receiving the power data through the conversion node by sensing the battery input current, and the delivery control circuit controlling the delivering power converter circuit to convert the input power to the converted power on the conversion node according to the power data at the same time;

wherein in the charging mode, at least one of the converted voltage, the converted current, the charging voltage, or the charging current is adjusted according to the power data;

wherein in the supply mode, the supplying power converter circuit converts a battery voltage of the battery cell to an output power on the conversion node to supply power to the external load unit, wherein the output power includes an output voltage and is compliant to a universal battery specification, and in the supply mode, power data is communicated between the external load unit and the rechargeable battery through the conversion node by the following ways:

(1) the load control circuit transmitting the power data through the conversion node by adaptively adjusting the load current, wherein the power data is expressed by plural current levels of the load current according to a present level of the load current and receiving the supply power from the rechargeable battery at the same time, and the battery control unit receiving the power data through the conversion node by sensing the load current and the battery control unit controlling the supplying power converter circuit to convert the battery voltage of the battery cell to the output power on the conversion node to supply power to the external load unit according to the power data at the same time; and (2) the battery control unit transmitting the power data through the conversion node by controlling the supplying power converter circuit to adaptively adjust the output voltage according to a present level of the output voltage and supply the output voltage to the external load unit at the same time, wherein the power data is expressed by plural voltage levels of the output voltage, and the load control circuit receiving the power data through the conversion node by sensing the output voltage, and the external load unit receiving the output power at the same time;

wherein in the supply mode, at least one of the output voltage or the load current is adjusted according to the power data.

11. The rechargeable battery system of claim 10, wherein the power data is defined by adjusting a time interval between the plural voltage levels and/or between the plural current levels.

12. The rechargeable battery system of claim 10, wherein the battery control circuit and the battery cell are assembled into a battery housing which is compliant to the universal battery specification, wherein the battery housing includes two and only two electrodes for receiving the converted power and communicating the power data in the charging mode, and for delivering the output power and communicating the power data in the supply mode, wherein one of the two and only two electrodes corresponds to the conversion node.

13. The rechargeable battery system of claim 10, wherein the output power includes an output voltage which substantially is 1.5V.

14. The rechargeable battery system of claim 10, wherein the battery control unit includes a switch and a current source coupled to the conversion node, wherein the battery control unit operates the switch and the current source to adjust the battery input current, so as to transmit the power data through the conversion node by the plural current levels.

* * * * *